Aug. 11, 1970   H. C. CROSLAND   3,523,857
DIAPHRAGM ASSEMBLY
Filed April 21, 1967
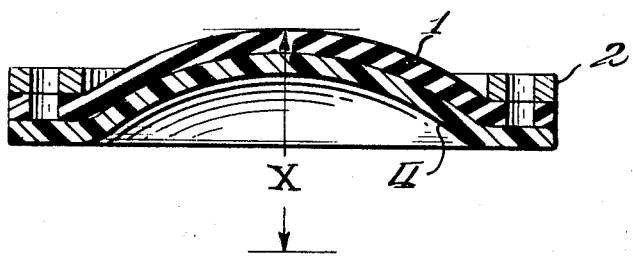
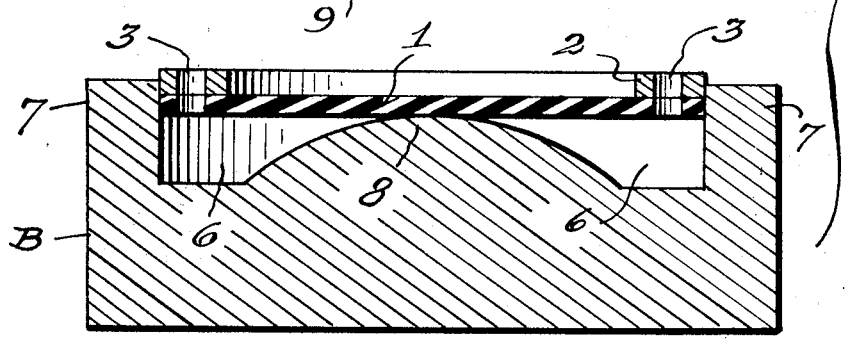
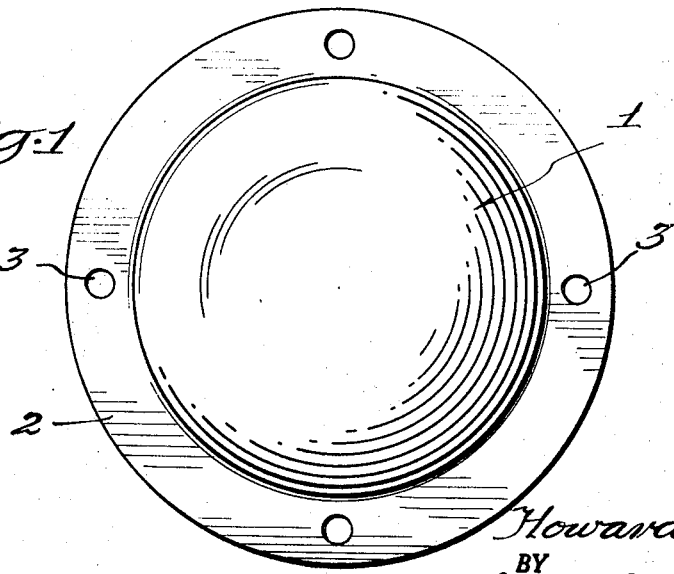
INVENTOR.
Howard C. Crosland
BY
John L. Hutchinson
Attorney

United States Patent Office 3,523,857
Patented Aug. 11, 1970

3,523,857
DIAPHRAGM ASSEMBLY
Howard C. Crosland, Hopewell Junction, N.Y., assignor to Chemical Rubber Products, Inc., Beacon, N.Y., a corporation of Delaware
Continuation-in-part of application Ser. No. 276,427, Apr. 29, 1963. This application Apr. 21, 1967, Ser. No. 633,674
Int. Cl. B32b 1/00; F16j 3/00
U.S. Cl. 161—40      4 Claims

ABSTRACT OF THE DISCLOSURE

A generally flat diaphragm assembly in which the central portion of the diaphragm is bloused or bagged to extend over a larger area than the plane of the assembly, and in which the outer portion of the diaphragm is smoothly and evenly bonded to a gasket.

CROSS-REFERENCES

This is a continuation-in-part of my application Ser. No. 276,427, filed Apr. 29, 1963, now abandoned.

BACKGROUND

The present invention relates to diaphragms of the type which may be used in gauges, pumps, valves and the like and, more particularly, to a gasket-diaphragm assembly suitable for immediate installation.

Diaphragms are normally flexible membranes, a few thousandths of an inch in thickness, and generally comprise a fabric such as cotton, nylon or a similar material impregnated or coated with an elastomer. When in use, diaphragms are reversibly flexed in response to liquid or air pressure and thus are continually subjected to distortion. The extent of travel will depend upon the pressure working against the surfaces of the diaphragms, the elasticity of the diaphragm and similar factors. Generally, diaphragms are designed so as to permit the desired degree of flexibility while avoiding undue stretching which may cause the diaphragm to fail as a result of fatigue.

Broadly, two types of flexible diaphragms are frequently manufactured. One type is made with a permanently formed dish-shaped center section obtained by curing the rubber composition of the diaphragm in a mold of the desired design. Molding is carried out by the application of heat to the rubber composition at temperatures in the order of 200–300° F. and above. The operation requires molds of such a design to avoid significant variances in the thickness of the molded diaphragm, and this in many instances contributes to the diaphragm's cost.

The second type comprises a flexible membrane, which may be classified as generally flat, but which may actually contain one or more convolutions. These convolutions may be permanently formed in the diaphragm or may be the result of physically gathering the material into multiple folds. In use, the size of the dish-shaped center or the number and dimensions of the convolutions essentially control the travel of the diaphragm and permit it to move through the desired stroke without unduly stretching or distorting the elastomer impregnated fabric.

For some light duty applications, wherein relatively limited travel and low pressures are involved, flat diaphragms are commonly used. Diaphragms of this type are frequently fabricated from large thin sheets of elastomer impregnated fabric. Generally, such flat diaphragms are intended to be sold at low cost and are adapted for installation in combination with a separate gasket. Frequently, flat diaphragms are formed slightly oversize in order to permit a limited amount of "bagging" or blousing or gathering in the center at the time of installation, thereby affording a desired stroke or reciprocal travel in operation. Since this procedure does not require molding at elevated temperatures, those diaphragms are generally characterized by uniform thickness and can be used with such heat sensitive or destructive materials as cork. In addition, the diaphragms being usually quite thin, are further characterized by good flexibility and sensitivity to changes in pressure.

Commonly, the preformed diaphragms with the centrally located bloused effect will include bolt openings around their periphery at predetermined points. During installation of the diaphragm it is often difficult to obtain the desired bagging in the center and the simultaneous alignment of the bolt openings around the diaphragm periphery with corresponding openings in the base of the pump, etc. and associated gasket. In addition, it is often difficult to obtain a satisfactory contact of the bagged or bloused material with the gasket. Often the folds around the periphery of the diaphragm will prevent a satisfactory seal with the gasket and result in an uneven surface.

Accordingly, it is the principal object of this invention to provide a unitary diaphragm and gasket assembly adapted for immediate installation wherein the diaphragm has been previously "bagged" and united to the gasket.

Another object is to provide a method for making an assembly of the foregoing type which is adapted for mass production at low cost per unit.

These and other objects will become more apparent from the drawing and specification describing the invention in more detail hereinafter.

SUMMARY

Briefly, the invention is a gasket assembly having a diaphragm which is bloused or bagged at its central or movable portion and a smooth, flat outer portion bonded to a gasket. The invention also pertains to the method of preparing the gasket without a molding operation. The result is an assembly which can be manufactured rather inexpensively and has a central portion capable of being easily moved while the outer portion forms a smooth, even surface with the gasket.

DRAWINGS

FIG. 1 is a plan of the generally flat diaphragm and gasket assembly of the present invention characterized by a central bloused effect.

FIG. 2 is an elevation, in cross section, disclosing the apparatus or "form" for uniting the components of the assembly.

FIG. 3 is a cross section of an assembled diaphragm and gasket including a removable plastic support for preventing deformation of the finished assembly during shipping and storage.

DETAILED DESCRIPTION

Referring to the drawing and a more detailed description of the invention, the numeral 1 designates a thin, generally flat and flexible diaphragm provided with a circular or ring gasket 2 permanently united to the top peripheral top surface of the diaphragm. The outer portion of the diaphragm 1 forms a smooth layer on gasket 2 without the bagged and uneven effect identified with many previous assemblies. Aligned holes 3 in the diaphragm and gasket are also provided at predetermined points to permit installation of the diaphragm by means of bolts. The central portion of diaphragm 1 is bloused so as to extend over an area larger than the normal plane of the diaphragm.

The diaphragm may be made of any of the customary materials such as a cotton or nylon fabric impregnated with any chemically resistant polymeric composition such as an elastomer, exemplified by neoprene and Buna N.

Usually, the diaphragm material is composed at least partially of the elastomeric material impregnated on a polymeric fabric which in some instances has some elastomeric properties also. Polyamides such as nylon illustrate polymers with these properties. The resultant diaphragm 1 before installation on the gasket 2 is further characterized by being capable of being deformed under pressure. The gasket 2 is normally composed of a low cost material sensitive to heat such as cork but may, of course, be formed from any suitable material capable of serving the purpose.

As indicated, the present invention is concerned with forming a permanent integral diaphragm and gasket assembly capable of immediate installation wherein the central portion of the diaphragm has been "bagged" or bloused or gathered to provide a predetermined degree of flexibility or draw. The method of forming such an assembly is illustrated in FIG. 2. Two complementary forming sections A and B are shown. Section B is provided with a circular recess 6 enclosed by a peripheral ridge 7 serving to define the recess. Centrally disposed within the recess 6 is a circular convex island 8 whose general design is that of a spherical section. Complementary section A has a diameter substantially equal to the diameter of recess 6 and is additionally provided with a concave recess 9, which may be but is not necessarily complementary to convex island 8 of section B.

The main function of section A is to provide a mechanical force to expand diaphragm 1 to assume the configuration of the surface of recess 6 and simultaneously unite gasket 2 to the diaphragm by means of an adhesive. There is no molding operation performed in the usual sense. In this operation, some of diaphragm 1 is drawn away from the gasket thereby aiding in the formation of the bloused effect and the smoothing of the outer periphery of the diaphragm to the gasket.

In order to form the assembly, the diaphragm 1 and gasket 2 are positioned within recess 6 and rest on island 8 as illustrated in FIG. 2. The underside of the gasket is normally provided with an adhesive, preferably of the pressure-sensitive type. After the gasket and diaphragm are positioned in place as described, section A is caused to close with section B thereby forcing the diaphragm to assume the configuration of the surface of recess 6 and uniting the gasket in place to the periphery of the diaphragm. During the forming operation the central portion of the diaphragm is stretched slightly as it is forced to conform to the shape of island 8. This slight stretching operation results in a permanent "bagging" or blousing or gathering of the central part of the diaphragm when the section B is removed, and therefore provides the desired degree of flexibility or travel such as indicated by the letter X in FIG. 3. The bolt openings 3 in the diaphragm and gasket may be be stamped out simultaneously with the assembly operation or subsequent thereto.

The extent of blousing or bagging of the diaphragm during the above described assembly operation will, of course, depend upon the height and diameter of island 8 in section B. It will be appreciated that the dimensions of island 8 should be limited in order to prevent undue distortion of the diaphragm. To obtain the desired bagging for light duty diaphragms a few thousandths of an inch thick, the height of island 8 and the diameter of the base of the island should be maintained preferably in the ratio of about 1 to 8. Dimension ratios of this order will generally prevent undue stretching of the diaphragm while permitting the desired degree of bagging. Materials from which the diaphragms are made, degree of flexibility and similar factors will, of course, be taken into consideration in determining the dimensions of island 8 for a particular diaphragm.

FIG. 3 discloses the assembled gasket and diaphragm and also discloses an optional temporary retainer 4. This retainer, which conforms to and is applied to the underside of the completed assembly, is used primarily to maintain the general configuration of the newly formed assembly during shipment and storage prior to use. The retainer is adapted to be readily removable prior to installation.

Retainer 4 is customarily composed of a relatively thin, normally rigid thermoplastic sheet a few thousandths of an inch thick. The presently preferred material is polyethylene, although any similar plastic material capable of being deformed to the contour desired may be used. To apply the retainer an appropriate size plastic blank is usually preheated to more readily permit deformation and the preheated blank inserted beneath the diaphragm in recess 6 of section B. When the diaphragm is bagged and united with the gasket, as described, the plastic retainer is simultaneously deformed and takes the general shape of the diaphragm in its extended position during the assembly operation. Due to its relative rigidity, the retainer holds the central gathered portion of the diaphragm in a substantially wrinkle free state, as shown in FIG. 3, and, correspondingly, prevents any tendency of the gathered part of the diaphragm to return to its original flat state. With polyethylene in particular, the preliminary heating produces tackiness which together with the subsequent pressure operation during assembly results in temporarily uniting the retainer to the underside of the diaphragm without preventing its subsequent removal prior to installation of the diaphragm assembly.

I claim:

1. A diaphragm assembly characterized by a central bloused effect, the assembly comprising a thin, generally flat, flexible, diaphragm of a material capable of being deformed under pressure and a separate peripheral gasket therefor, the outer portion of the diaphragm being permanently bonded to and forming a smooth layer on the gasket, the central portion of the diaphragm being bloused so as to extend over an area larger than the normal plane of the diaphragm, the bloused portion being of a uniform thickness and not deformed.

2. The assembly of claim 1 wherein the diaphragm is composed at least partially of an elastomeric material.

3. The assembly of claim 1 wherein the diaphragm is an elastomeric-treated polymeric fabric and the gasket is cork.

4. The assembly of claim 3 wherein the diaphragm is an elastomeric-treated polyamide fabric.

References Cited

UNITED STATES PATENTS

| | | | |
|---|---|---|---|
| 1,914,600 | 6/1933 | Hewitt | 92—98 X |
| 2,250,674 | 7/1941 | McBurney | 137—157 |
| 2,270,259 | 1/1942 | Burke | 92—99 X |
| 2,638,930 | 5/1953 | Barr | 137—793 |
| 2,642,090 | 6/1953 | Barr | 264—136 X |
| 2,697,057 | 12/1954 | Senger et al. | 264—292 X |
| 3,032,462 | 5/1962 | Saporito | 156—242 |

FOREIGN PATENTS 793,707  4/1958  Great Britain.

JOHN T. GOOLKASIAN, Primary Examiner

J. C. GIL, Assistant Examiner

U.S. Cl. X.R.

92—96, 103; 156—221, 229; 161—42; 264—292